United States Patent
Ashkin et al.

[15] 3,662,183
[45] May 9, 1972

[54] CONTINUOUSLY TUNABLE OPTICAL PARAMETRIC OSCILLATOR

[72] Inventors: Arthur Ashkin, Rumson; John Ernst Bjorkholm, Holmdel, both of N.J.

[73] Assignee: Bell Telephone Laboratories, Incorporated, Murray Hill, Berkeley Heights, N.J.

[22] Filed: Dec. 28, 1970

[21] Appl. No.: 101,608

[52] U.S. Cl. .......................... 307/88.3, 331/96, 331/107 R
[51] Int. Cl. ........................................................ H03f 7/00
[58] Field of Search ...................... 307/88.3; 331/107 R, 96

*Primary Examiner*—Roy Lake
*Assistant Examiner*—Darwin R. Hostetter
*Attorney*—R. J. Guenther and Arthur J. Torsiglieri

[57] ABSTRACT

The gain curve peak and the signal axial modes are made to track together in a continuously tunable, singly resonant optical parametric oscillator (SRO) in which nonresonant pump radiation and nonresonant idler radiation are each made to reflect back upon themselves and to traverse the nonlinear medium twice. In a preferred embodiment, in at least a portion of the oscillator the pump is made to propagate in an optical path excluding the resonated signal (nonresonant idler SRO). In this portion and in the signal resonator the round-trip optical path lengths of the pump and resonated signals, respectively, are varied in accordance with a prescribed relationship. The path lengths may be altered by several means including transparent wedges, gas cells, rotating plates or piezoelectric crystals mounted on appropriate mirrors.

14 Claims, 6 Drawing Figures

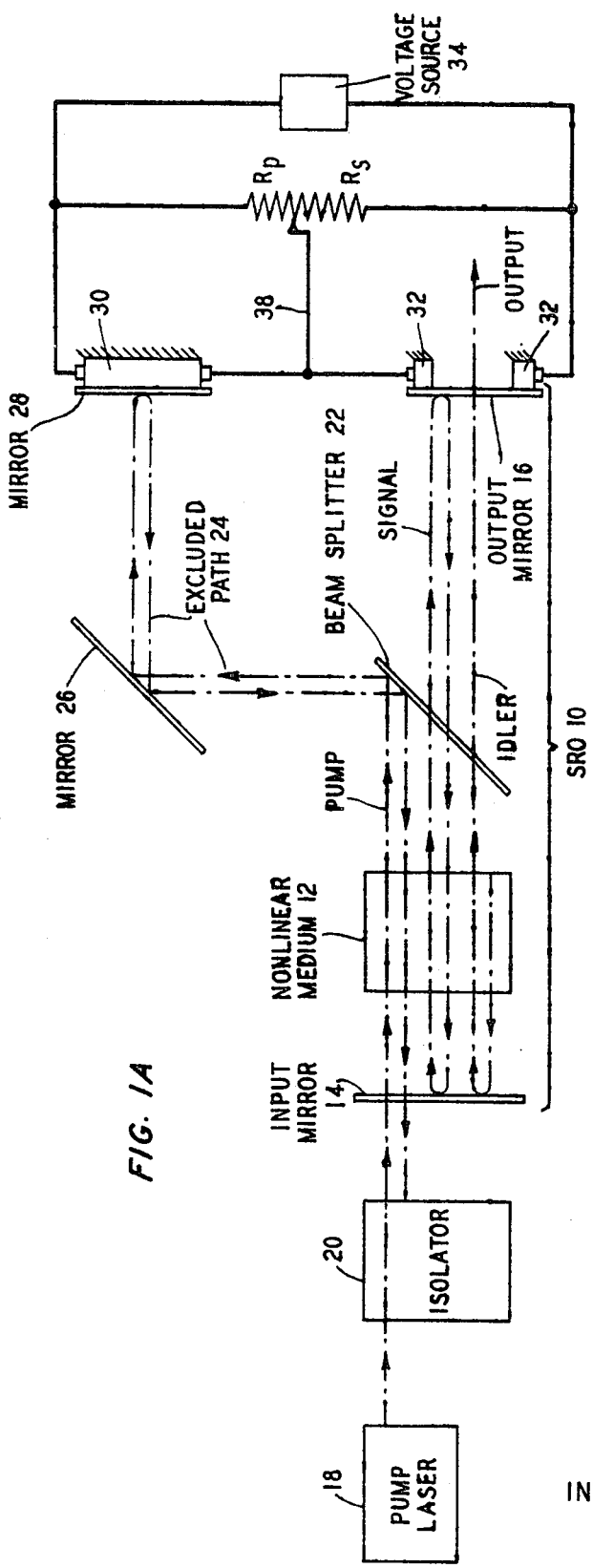
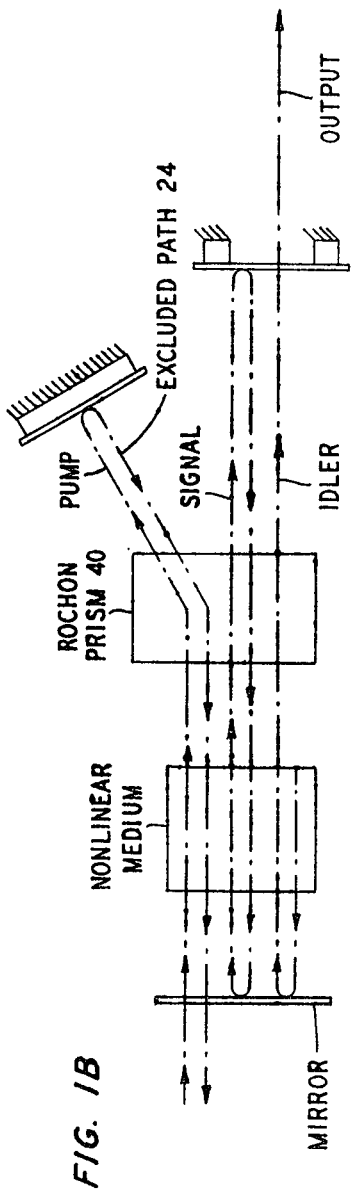
FIG. 1A
FIG. 1B
INVENTORS: A. ASHKIN
J. E. BJORKHOLM
BY Michael J. Urbano
ATTORNEY

CONTINUOUSLY TUNABLE OPTICAL PARAMETRIC OSCILLATOR

BACKGROUND OF THE INVENTION

This invention relates to parametric oscillators and, more particularly, to continuously tunable optical parametric oscillators.

Since the advent of optical parametric oscillators, workers in the art have strived to achieve continuous frequency tuning, but have until recently been thwarted in their attempts. At first the limited power obtainable from available pump sources dictated that both the signal and idler frequencies be resonant in order to obtain a low threshold. As discussed by G. D. Boyd and A. Ashkin in Physical Review, 146, 187 (1966), one primary disadvantage of such a doubly resonant oscillator (DRO) is the existence of a phenomenon termed the "cluster effect" which causes tuning to be erratic and discontinuous because of the need to achieve simultaneous resonance of the signal and idler in the doubly resonant cavities employed. That is, because the signal and idler resonators are not independently tunable it is not possible generally to ensure that both the signal and idler are simultaneously resonant. For example, the idler frequency corresponding to a given signal frequency resonance may be nonresonant. In summary, to achieve tuning in a DRO three parameters, the gain curve position and the signal and idler mode positions, must be varied in a complicated way. In an improved form of the DRO, however, the signal and idler are made separately tunable in ring resonators as disclosed in our copending application Ser. No. 808,768 filed on Mar. 20, 1969 and assigned to the assignee hereof.

Another solution proposed by us to eliminate the cluster effect is the use of a singly resonant optical parametric oscillator (SRO) as described in our copending application Ser. No. 808,767 filed on Mar. 20, 1969 and assigned to the assignee hereof, and as also described in two articles, Applied Physics Letters, 13, 53 (July 15, 1968) and Applied Physics Letters, 13, 399 (Dec. 15, 1968). In this form of SRO typically the idler is made nonresonant and along with the pump traverses the medium only once. Coarse frequency tuning is typically brought about by changing the temperature of the nonlinear medium or by rotating the angle of the optic axis of the nonlinear medium with respect to the direction of pump propagation. Such tuning changes two parameters: Position of the peak of the gain curve of the medium in the frequency domain as well as the mode position of the resonant signal. It has been found that the rate of change of frequency with temperature or angle is typically greater for the position of the peak of the gain curve than for the signal mode position. Consequently, in such instances the gain curve and signal mode positions do not track together. Assuming single mode operation, only the signal mode nearest the peak of the gain curve will oscillate. If, therefore, the mode spacing is relatively small and the mode position shifts by more than half the mode spacing, the failure of the gain curve and mode positions to track results in oscillation jumping to an adjacent mode. In this form of SRO, therefore, tracking is typically produced by changing not only the temperature or angle of the medium but also by changing some other parameter, such as resonator length, under conditions that require that a tedious and relatively complicated analysis be performed for each such change.

It is one object of our invention to tune continuously an optical parametric oscillator in a more convenient fashion.

It is another object of our invention to cause the frequency of the gain curve peak of a nonlinear medium and the mode position of the resonated signal or idler to track together in a singly resonant optical parametric oscillator.

SUMMARY OF THE INVENTION

These and other objects are accomplished in accordance with an illustrative embodiment of our invention a continuously tunable, singly resonant optical parametric oscillator in which nonresonant pump radiation and nonresonant idler radiation are each made to reflect back upon themselves and to traverse the nonlinear medium twice only. In a preferred embodiment, in at least a portion of the oscillator, hereinafter termed the excluded path, the pump is made to propagate in an optical path excluding the resonated signal (nonresonant idler SRO). It should be noted, however, that the excluded path could contain the signal and exclude the pump since the two would still propagate in separate paths in a portion of the oscillator.

In the excluded path and in the signal resonator the round-trip optical path lengths of the pump and signal, respectively, are varied so that the change in signal path length is much greater (e.g., 100 times greater) than the change in pump path length. Preferably the changes in path lengths are made to satisfy approximately the following relationship:

$$\frac{\Delta L_s}{\Delta L_p} = 3/4 \frac{\lambda_{so}}{\lambda_p} N \tag{1}$$

where $\Delta L_s$ = change in optical path length for the signal radiation
$\Delta L_p$ = change in optical path length for the pump radiation
$\lambda_{so}$ = signal wavelength corresponding to a momentum mismatch $\Delta k = 0$
$\lambda_p$ = pump wavelength
$N$ = number of signal axial modes contained in the full bandwidth of the SRO for $\Delta k = 0$.

The change in optical path length may be effected by means of several devices including (1) a pair of transparent wedges made to slide along their abutting faces, (2) a gas cell, or (3) a rotating parallel plate, one of which is positioned in the signal resonator and one in the excluded path. Alternatively, the path length changes may be effected by piezoelectric crystals mounted on the pump reflector (used to reflect the pump back upon itself) and on at least one of the signal resonator reflectors. These devices are typically ganged together by appropriate electrical and/or mechanical means to produce simultaneous changes in path length to satisfy approximately equation (1) and thereby ensure that the peak of the gain curve and the axial modes track together in the frequency domain.

It is also possible to produce the desired path length changes without utilizing an oscillator configuration including an excluded path. Thus, when the pump and resonant signal are collinear, advantage may be taken of their difference in frequency or polarization to insert in the collinear path either a dispersive or birefringent device, respectively, to selectively effect changes in the phase (and hence optical path length) of the pump and signal by different amounts as prescribed above.

It should be noted that our technique produces continuous fine tuning without the necessity of introducing changes in the temperature or angle of the nonlinear medium. Thus, although the temperature and/or angle of the medium may be changed in our invention to produce coarse changes in the center frequency, once the temperature and angle are fixed, continuous fine tuning, typically over many angstroms (hundreds of gigahertz), results from the aforementioned controlled changes in optical path length.

The use in our invention of both a double pass pump and a double pass idler can be explained briefly as follows. In the earlier single pass SRO (resonant signal) in which both the nonresonant pump and idler transverse the nonlinear medium only once, the relative phase of the pump, signal and idler waves are unimportant since the idler amplitude is zero at the input face of the medium; that is, the beating of the signal and pump determine the phase of the idler to maximize gain. Similarly, in a double pass SRO in which the pump traverses the medium twice only, but the idler traverses the medium only once, the relative phases for the same reasons are also unimportant. Continuous tuning in both types of SRO is limited by the fact that the only way to change gain curve position is to change the phase matching conditions as by changing the temperature or angle of the medium or by applying an electric field thereto. Such tuning is coarse and the resonant signal modes do not track with the peak of the gain curve.

It can be shown, however, that the double pass SRO has several advantages including reduced threshold (ideally by a factor of two), decreased buildup time and improved efficiency as compared to the single pass SRO. In order to take advantage of these properties we have modified the double pass SRO to include a double pass nonresonant idler as well as a double pass nonresonant pump. By reflecting the idler back upon itself to traverse the medium twice only, the amplitude of the idler at one input face of the nonlinear medium is made nonzero. Depending on the relative phases of the waves, therefore, the peak of the gain curve may not occur for a momentum mismatch $\Delta k = 0$. Consequently, changing the relative phase of the three waves will change the position of the gain curve peak in $\Delta k$-space, i.e., in the frequency domain.

In addition to the above advantages, it can be demonstrated that the threshold of the double pass idler-double pass pump SRO ideally is reduced by a factor of four as compared to the single pass SRO.

BRIEF DESCRIPTION OF THE DRAWING

These and other objects of the invention, together with its various features and advantages, can be move easily understood from the following more detained description taken in conjunction with the accompanying drawing, in which:

FIG. 1A is a schematic of an illustrative embodiment of our invention utilizing a beam splitter and piezoelectric mounts;

FIG. 1B is a schematic of another embodiment of the invention using a polarization sensitive prism and piezoelectric mounts;

DETAILED DESCRIPTION

Figure 2A:
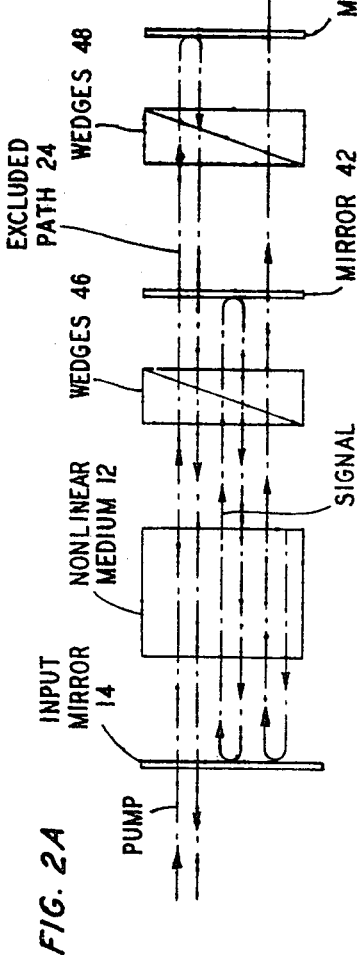
FIG. 2A is a schematic of another embodiment of our invention using a pair of wedges.
Figure 3:
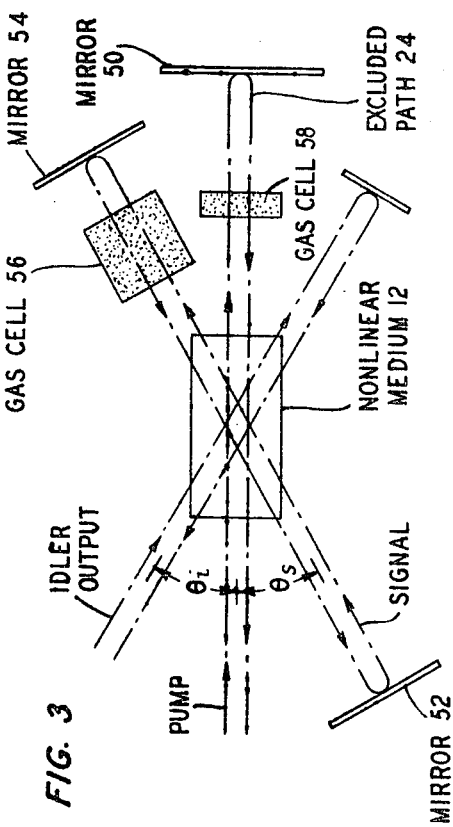
FIG. 3 is a schematic of another embodiment of our invention illustrating the use of gas cells and noncollinear parametric interaction.

Before discussing our invention in detail, it should be noted that in FIGS. 1A, 1B, and 2A, which show embodiments utilizing a collinear parametric interaction in the nonlinear medium, the pump, signal, and idler are shown to propagate in parallel, non-overlapping paths for clarity and convenience only. Actually, for parametric interaction to take place, the pump, signal, and idler must overlap in some finite volume of the nonlinear medium. In FIG. 3, on the other hand, noncollinear parametric interaction is depicted. In both cases a nonconventional form of light propagation and reflection has also been adopted for the purposes of clarity and convenience; that is, a light beam reflected from a perpendicular reflector is shown by means of a loop drawn at the reflection surface so that the beam is reflected into a parallel non-overlapping path rather than being reflected back upon itself as would actually be the case.

Turning now to FIG. 1A, there is shown a singly resonant optical parametric oscillator (SRO) 10 comprising a nonlinear medium 12 disposed between parallel mirrors 14 and 16. Input mirror 14 is highly transmissive to pump radiation and highly reflective to both signal and idler radiation. Output mirror 16, on the other hand, is highly reflective to signal radiation (for a resonant signal, nonresonant idler SRO) and highly transmissive to idler radiation which forms the optical output of the SRO. Signal and idler radiation is generated in nonlinear medium 12 by means of pump radiation from pump laser 18 which passes through isolator 20 and input mirror 14 to incidence on the medium 12. It should be noted that it may be desirable to use the signal as an output instead of the idler, in which case mirror 16, for example, may be made partially transmissive to signal radiation. Utilizing the signal as an output might be advantageous when a multimode pump is employed. Under such circumstances the idler would be multimode also, but the signal could be single mode, and desirable characteristic in most transmission systems.

In accordance with this illustrative embodiment of our invention, the pump radiation after passage through the medium 12 is made incident upon a beam splitter 22 which is highly reflective to pump radiation but highly transmissive to signal and idler radiation. Accordingly, the pump radiation is reflected into an excluded path 24, i.e., a path which excludes the resonate signal radiation. The path 24 is formed by a mirror 26 disposed parallel to beam splitter 22 so as to reflect pump radiation to normal incidence upon mirror 28. In practice, of course, mirror 26 can be eliminated and mirror 28 placed in a position normal to the direction of pump radiation reflected from beam splitter 22. As shown in the drawing, pump radiation is reflected back upon itself at mirror 28 and passes once again through the medium 12 but is prevented by isolator 20 from being incident upon pump laser 18. Similarly, idler radiation is reflected back upon itself at input mirror 14 and thereby passes through medium 12 and output mirror 16.

Importantly, both the pump radiation and the idler radiation are nonresonant and traverse the nonlinear medium only twice. The second idler traversal of the medium is essential for making the oscillator sensitive to changes in the relative phase of the three waves produced by changes in round-trip optical path length. As discussed previously, the use of this form of nonresonant double pass pump and double pass idler has the advantages of reduced threshold, decreased build-up time, and improved efficiency as compared to a single pass SRO in which the pump and idler traverse the medium only once.

In order that the round-trip optical path lengths of the resonated signal and of the pump radiation in the excluded path 24 be varied, preferably in accordance with equation 1, piezoelectric crystals 30 and 32 are mounted on mirrors 28 and 16, respectively. Displacements of these mirrors are produced by voltages applied thereto from voltage source 34 and voltage divider 36. Typically, the voltage divider 36 comprises a standard potentiometer in which wiper arm 38 divides the total resistance into resistance $R_p$ and $R_s$ in parallel with crystals 30 and 32, respectively. In order to extract the idler output through mirror 16, crystal 32 is typically provided with an aperture or is cylindrically shaped as shown in FIG. 1A.

To produce tracking between the peak of the gain curve and the axial modes of the SRO, the potentiometer is adjusted such that the ratio of $R_s$ to $R_p$ is equal to the right-hand side of equation 1, that is, $$\frac{R_s}{R_p} = 3/4 \frac{\lambda_{so}}{\lambda_p} N \qquad (2)$$

The following components, materials and parameters are given for the purposes of illustration only and are not to be construed as limitations upon the scope of the invention. Illustratively, therefore, plane polarized pump radiation of 1 watt at 0.532 $\mu$m is produced by internally frequency doubling the radiation of a c.w. Nd:YAG laser at 1.064 $\mu$m by the use of an intracavity barium sodium niobate crystal. Isolator 20 typically comprises a well known Faraday rotator disposed between a pair of crossed polarizers, and nonlinear medium 12 typically is a 1 cm long lithium niobate crystal having its optic axis oriented at 90° to the plane of polarization of the pump radiation. Piezoelectric crystals 30 and 32 typically provide a maximum translation of about 500 $\mu$m; that is, they typically produce displacements of about 1.5 $\mu$m/volt with a maximum of about 750 volts. With the temperature of the nonlinear medium 12 being maintained at 318° K by means well known in the art (but not shown), signal and idler radiation are generated at approximately 1.025 $\mu$m and 1.106 $\mu$m, respectively.

Utilizing the above parameters and the published thesis of R. L. Byer entitled "Parametric Fluorescence and Optical Parametric Oscillation," Microwave Laboratories Report No. 1,711, Dec. 1968, Stanford University, Stanford, California, it can be shown that the bandwidth of the SRO is equal to $1/bl$, where $b$ is the rate of change of momentum mismatch and $l$ is the length of the nonlinear medium assumed here to be 1 cm. Near degeneracy, a correction factor is applied to calculate $b$, and from Byer it is found that $b = 0.875 \times 10^{-12}$ sec/cm, and hence the bandwidth equals $1.14 \times 10^{12}$ cycles per sec (38 A). For a signal resonator length $L_s = 5$ cm (the separation of mirrors 14 and 16), the axial mode spacing is equal to $c/2L_s = 3 \times 10^9$ cps, where $c$ is the speed of light. It therefore follows that the number $N$ of axial modes in the bandwidth is approximately 380. With these parameters, fine tuning is obtained over approximately three-quarters of the bandwidth which is equivalent to about 860 gigahertz or 28.5 A. The utilization of other pump sources and operation wavelengths will produce larger bandwidths, and hence larger tuning ranges. Having thus determined the value of $N$, the right-hand side of equation 1 is thereby completely specified since $\lambda_{so}$ and $\lambda_p$ are known a priori. Consequently, the ratio of $R_s$ to $R_p$ can be determined to satisfy equation 2.

Other techniques for producing the excluded path 24 may be utilized as shown in FIG. 1B in which the beam splitter 22 of FIG. 1A is replaced by a Rochon prism 40 or other similar polarization sensitive device. The Rochon prism 40, which is typically fabricated of calcite, deflects into an oblique path extraordinary radiation (i.e., the pump) but transmits without deviation ordinary radiation (i.e., the signal and idler). For simplicity, the pump, isolator, and voltage divider circuitry have been omitted from FIG. 1B. The operation of this embodiment, however, is identical to that described with reference to FIG. 1A.

While the embodiments of FIG. 1A and 1B each employ an excluded path which is noncollinear with the resonated signal, it is possible as shown in FIG. 2A to utilize a completely collinear configuration. In this embodiment pump radiation from a source not shown is transmitted through an input mirror 14 to incidence on nonlinear medium 12 to thereby generate radiation at signal and idler frequencies. The signal radiation is made resonant in a resonator formed by input mirror 14 and intermediate mirror 42, the latter being highly transmissive to both the pump and idler radiation and the former being highly reflective to both the signal and idler radiation. Consequently, idler radiation is reflected back upon itself at input mirror 14 to traverse medium 12 twice only. Similarly, the pump radiation after transmission through mirror 42 is reflected back upon itself at output mirror 44 (which is also highly transmissive to idler radiation) to traverse medium 12 twice only. The region between mirrors 42 and 44 includes the pump radiation but excludes the signal radiation, and hence forms the excluded path 24.

Figure 2B:
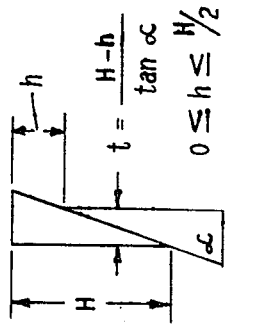
FIG. 2B is a schematic of the wedges of FIG. 2A displaced with respect to one another.

FIG. 2A also shows an alternate means of varying the round-trip optical path lengths of the signal and pump in accordance with equation 1. This means includes in the signal resonator a pair of wedges 46 and in the excluded path a pair of wedges 48. In each case these wedges are preferably right triangular prisms having their hypotenuse faces slidably abutting one another. The wedges in a displaced position are shown in FIG. 2B. In this case the changes in round-trip optical path length for the signal and pump are given by $$\Delta L_s = (n_s - 1)\Delta t_s \quad (3)$$
$$\Delta L_p = (n_p - 1)\Delta t_p \quad (4)$$

where $n_s$ and $n_p$ are the indices of refraction of the wedges at the signal and pump frequencies, respectively, and $\Delta t_s$ and $\Delta t_p$ are the changes in thickness of wedges 46 and 48 measured in the direction of light propagation therethrough. If it is assumed that the wedges 46 and 48 are ganged together so that $\Delta t_s = K \Delta t_p$, where $K$ is a constant, then from equation 1 it follows that $$K \frac{(n_s - 1)}{(n_p - 1)} = 3/4 \frac{\lambda_{so}}{\lambda_p} N \quad (5)$$

Figure 2C:
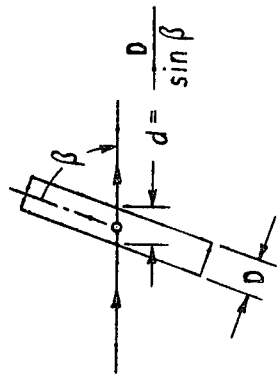
FIG. 2C is a schematic of a rotatable plate which effects changes in path length similar to those produced by the wedges of FIGS. 2A and 2B.

It is of course evident that the wedges of FIG. 2A can readily be utilized in place of the piezoelectric mounts of FIG. 1A and FIG. 1B. Alternatively, changes in optical path length can be effected by a rotating parallel plate as shown in the top view of FIG. 2C.

An additional embodiment of our invention utilizing noncollinear parametric interaction is shown in FIG. 3 in which pump radiation is transmitted through nonlinear medium 12 and reflected back upon itself by mirror 50. The signal resonator, which is formed by mirrors 52 and 54, has however its optic axis noncollinear with the direction of pump propagation, and as shown in FIG. 3 is oriented at an angle $\theta_s$ to that direction. As is well known in the art, idler radiation will be generated at an angle $\theta_i$ from the pump radiation and at an angle $(\theta_s + \theta_i)$ from the signal radiation. In this embodiment, the excluded path 24 inherently arises from the utilization of noncollinear interaction. In order to effect the desired changes in optical path length, gas cells 56 and 58 are inserted in the signal resonator and in the excluded path 24, respectively. The length of the cell 56 in the resonator is preferably longer than that in the excluded path and the gas species and gas pressures are chosen by means well known in the art to satisfy equation 1.

It is understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the various devices previously described for effecting change in optical path length are interchangeable with each other and each may be used with embodiments employing either collinear or noncollinear parametric interaction.

What is claimed is:

1. A continuously tunable optical parametric oscillator comprising
    a nonlinear medium,
    pumping means applying to said medium pump radiation effective to generate signal and idler radiation,
    resonator means for making resonant either the signal or idler radiation, but not both,
    means for causing both the pump radiation and the nonresonant radiation to traverse said medium twice only, and
    adjustable means for altering the round-trip optical path length of the pump radiation and for altering the round-trip optical path length of the resonant radiation by a much greater amount effective to cause the peak of the gain curve of said medium and the axial modes of the resonant radiation to track together in the frequency domain.

2. The oscillator of claim 1 including an excluded optical path in which either the pump radiation or the resonant radiation propagates, but not both, said adjustable means for altering the path lengths of the pump radiation and the resonant radiation being disposed, respectively, in said excluded path and in said resonator means.

3. The oscillator of claim 2 wherein the pump, signal and idler radiation propagate collinearly in said medium and in combination with selection means disposed within said resonator to cause the pump radiation to traverse said excluded path.

4. The oscillator of claim 3 wherein said selection means comprises a dichroic mirror highly reflective to pump radiation and highly transmissive to signal and idler radiation.

5. The oscillator of claim 3 wherein the pump and resonant radiation are orthogonally polarized and said selection means comprises a polarization sensitive device for deflecting the pump radiation into said excluded path 6. The oscillator of claim 3 wherein said resonator means comprises a pair of parallel reflectors at least one of said reflectors being highly transmissive to pump radiation, and said causing means includes a pump reflector disposed parallel to said one reflector to form said excluded path therebetween.

7. The oscillator of claim 1 wherein the pump, signal and idler radiation traverse said medium noncollinearly and such that the directions of signal and idler radiation form an angle of about $(\theta_s + \theta_i)$ with one another where $\theta_s$ and $\theta_i$ are the angles which the signal and idler make, respectively, with the direction of pump radiation.

8. The oscillator of claim 2 wherein said resonator means comprises a pair of parallel reflectors, said causing means includes a pump reflector disposed normal to the direction of pump radiation propagation and said adjustable means comprises means for displacing said pump reflector and at least one of said parallel reflectors by a much greater amount in the direction of radiation incident thereon.

9. The oscillator of claim 8 wherein said displacing means comprises at least two piezoelectric crystals, one of which is mounted on at least one of said parallel reflectors and the other of which is mounted on said pump reflector.

10. The oscillator of claim 2 wherein said adjustable means comprises a transparent device the optical thickness of which in the direction of radiation propagation therethrough is controllably changeable, at least one of said devices being disposed in said excluded path and at least one within said resonator means.

11. The oscillator of claim 10 wherein said device comprises a pair of right triangular prisms having their hypotenuse faces slidable abutting one another, said faces being disposed transverse to the direction of propagation therethrough and means for sliding said prisms along said faces so that the change in round-trip optical path length of pump radiation in said excluded path is much less than the change in round-trip optical path length of resonant radiation in said resonator means.

12. The oscillator of claim 10 wherein said device comprises a body having a pair of parallel faces, the plane including the normal to said faces being parallel to the direction of radiation propagation through said body, said body being rotatable about an axis perpendicular to said plane.

13. The oscillator of claim 2 wherein said adjustable means comprises at least two gas cells, at least one of which is disposed in said excluded path and at least one of which is disposed in said resonator means, and means for controllably varying the pressure within said cells so that the change in round-trip optical path length of pump radiation in said excluded path is much less than the change in round-trip optical path length of resonant radiation in said resonator means.

14. The oscillator of claim 1 wherein said adjustable means is effective to satisfy approximately the following relationship.

$$\frac{\Delta L_s}{\Delta L_p} = \frac{3}{4} \frac{\lambda_{so}}{\lambda_p} N$$

where
$\Delta L_s$ = change in optical path length for the signal radiation
$\Delta L_p$ = change in optical path length for the pump radiation
$\lambda_{so}$ = signal wavelength corresponding to a momentum mismatch $\Delta k = 0$
$\lambda_p$ = pump wavelength for $\Delta K = 0$
$N$ = number of signal axial modes contained in the full bandwidth of the SRO for $\Delta k = O$.

* * * * *